United States Patent
Albers et al.

(10) Patent No.: US 8,038,067 B2
(45) Date of Patent: Oct. 18, 2011

(54) TRANSACTION CARD WITH OSCILLATING MEMBER

(75) Inventors: Chad Albers, Minneapolis, MN (US); David Ledsinger, Golden Valley, MN (US); Dennis R. Smith, Minnetonka, MN (US); Stacy M. Jensen, Anoka, MN (US); Adam W. Reynolds, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 350 days.

(21) Appl. No.: 12/488,321

(22) Filed: Jun. 19, 2009

(65) Prior Publication Data

US 2010/0325038 A1 Dec. 23, 2010

(51) Int. Cl.
*G06K 19/00* (2006.01)
(52) U.S. Cl. .......................... 235/487; 235/492; 235/493
(58) Field of Classification Search .................. 235/487, 235/488, 492, 493, 494
See application file for complete search history.

(56) References Cited

U.S. PATENT DOCUMENTS

| | | |
|---|---|---|
| 744,545 A | 11/1903 | Hervey |
| 966,107 A | 8/1910 | Lowe |
| 976,495 A | 11/1910 | Reeves |
| 1,041,573 A | 10/1912 | Baring-Gould |
| 1,546,928 A | 7/1925 | Graham |
| 1,618,710 A | 2/1927 | Hose |
| 1,951,022 A | 3/1934 | Iverson |
| 1,961,973 A | 6/1934 | Jenkins |
| 2,005,859 A | 6/1935 | Hoke |
| D142,161 S | 8/1945 | Braund |
| 2,476,742 A | 7/1949 | Lareau et al. |
| 2,573,625 A | 10/1951 | Swart |
| 2,728,167 A | 12/1955 | Knott |
| 2,732,655 A | 1/1956 | Dirckx |
| 2,787,852 A | 4/1957 | Youngren |
| 2,815,605 A | 12/1957 | Connell |
| 2,834,123 A | 5/1958 | Knight |

(Continued)

FOREIGN PATENT DOCUMENTS

GB 2277482 A 11/1994

OTHER PUBLICATIONS

GiftCard with Rotating Pinwheel Offered for Sale at Target retail stores beginning Dec. 26, 2004 (2 pages).

(Continued)

*Primary Examiner* — Daniel Hess
*Assistant Examiner* — Paultep Savusdiphol
(74) *Attorney, Agent, or Firm* — Griffiths & Seaton PLLC

(57) ABSTRACT

A transaction card includes a base member, an auxiliary member, and an account identifier. The base member defines a first surface, a second surface opposite the first surface, and a spiral cut extending through the base to define a spiral portion. The spiral portion is stretched to extend in a conic helical form in front of a portion of the first surface defined by a remainder of the base member. The auxiliary member is coupled to the spiral portion opposite the portion of the first surface defined by the remainder of the base member. The account identifier is fixedly connected to one of the base member and the auxiliary member. The account identifier links the transaction card to at least one of an account and a record and is machine readable by a point-of-sale terminal. Other cards, combinations and associated methods are also disclosed.

24 Claims, 8 Drawing Sheets

U.S. PATENT DOCUMENTS

| | | | |
|---|---|---|---|
| 2,884,738 A | | 5/1959 | Lohnes et al. |
| 2,931,657 A | | 4/1960 | Lewis |
| 3,228,139 A | | 1/1966 | Lohnes |
| 3,235,988 A | | 2/1966 | Paige |
| 3,427,642 A | * | 2/1969 | Mohr .................. 40/124.08 |
| 3,710,508 A | | 1/1973 | McLaren |
| 3,717,942 A | | 2/1973 | Presby |
| 4,054,242 A | | 10/1977 | Strobe |
| 4,309,839 A | | 1/1982 | White et al. |
| 4,341,035 A | | 7/1982 | Jaworski et al. |
| 4,407,504 A | | 10/1983 | Popov |
| 4,763,427 A | | 8/1988 | Schrager |
| 4,774,780 A | | 10/1988 | Crowell |
| 5,055,084 A | * | 10/1991 | Jokic .................. 446/486 |
| 5,871,237 A | | 2/1999 | Hunt |
| 6,146,721 A | | 11/2000 | Freynet |
| 6,192,608 B1 | | 2/2001 | Williams |
| 6,729,930 B1 | * | 5/2004 | Lui .................. 446/139 |
| RE38,696 E | | 2/2005 | Williams |
| 6,869,369 B2 | | 3/2005 | Fairweather |
| 7,048,605 B2 | | 5/2006 | Hawthorne et al. |
| 7,264,155 B2 | | 9/2007 | Halbur et al. |
| 7,314,179 B1 | | 1/2008 | Halbur et al. |
| 2002/0096873 A1 | | 7/2002 | Scheinblum |
| 2002/0143697 A1 | | 10/2002 | Gotfried |
| 2004/0249748 A1 | | 12/2004 | Schultz et al. |
| 2005/0001113 A1 | * | 1/2005 | Sullivan et al. .................. 248/127 |
| 2005/0061889 A1 | | 3/2005 | McGee et al. |
| 2007/0155281 A1 | | 7/2007 | Chang |
| 2007/0209243 A1 | * | 9/2007 | Toulotte .................. 40/124.08 |
| 2007/0256337 A1 | * | 11/2007 | Segan .................. 40/124.03 |
| 2007/0266605 A1 | | 11/2007 | Halbur et al. |
| 2007/0295820 A1 | | 12/2007 | Halbur et al. |
| 2008/0148727 A1 | | 6/2008 | de Ojeda |
| 2008/0149709 A1 | | 6/2008 | Boyd et al. |
| 2008/0149727 A1 | | 6/2008 | Boyd et al. |
| 2008/0149728 A1 | | 6/2008 | Lindahl et al. |
| 2008/0200093 A1 | | 8/2008 | Stephenson |
| 2008/0245857 A1 | | 10/2008 | Lazarowicz et al. |
| 2008/0290177 A1 | | 11/2008 | Halbur et al. |
| 2009/0024519 A1 | | 1/2009 | Halbur et al. |

OTHER PUBLICATIONS

"Contactless Payments: Consumer Trends and Usage Preferences," firstdata.com, 2008, 2 pages.

Wade, Will, "First Data Sees Sticker Device as Mobile-Pay Bridge," American Banker, Aug. 25, 2008, 2 pages.

"GO-Tag™ Solution," firstdata.com, 2008, 2 pages.

"Transaction Card With Movable Memeber," U.S. Appl. No. 11/965,474, as filed on Dec. 27, 2007.

* cited by examiner

US 8,038,067 B2

TRANSACTION CARD WITH OSCILLATING MEMBER

BACKGROUND OF THE INVENTION

Stored-value cards and other transaction cards come in many forms. A gift card, for example, is a type of transaction card that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction card including a base member, an auxiliary member, and an account identifier. The base member defines a first surface, a second surface opposite the first surface, and a spiral cut extending through the base member from the first surface to the second surface to define a spiral portion. The spiral portion is stretched to extend in a conic helical form in front of a portion of the first surface defined by a remainder of the base member. The auxiliary member is coupled to the spiral portion opposite the portion of the first surface defined by the remainder of the base member. The account identifier is fixedly connected to one of the base member and the auxiliary member. The account identifier links the transaction card to at least one of an account and a record and is machine readable by a point-of-sale terminal. Stored-value cards, methods of providing a transaction card, and other embodiments of stored-value or transaction cards and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
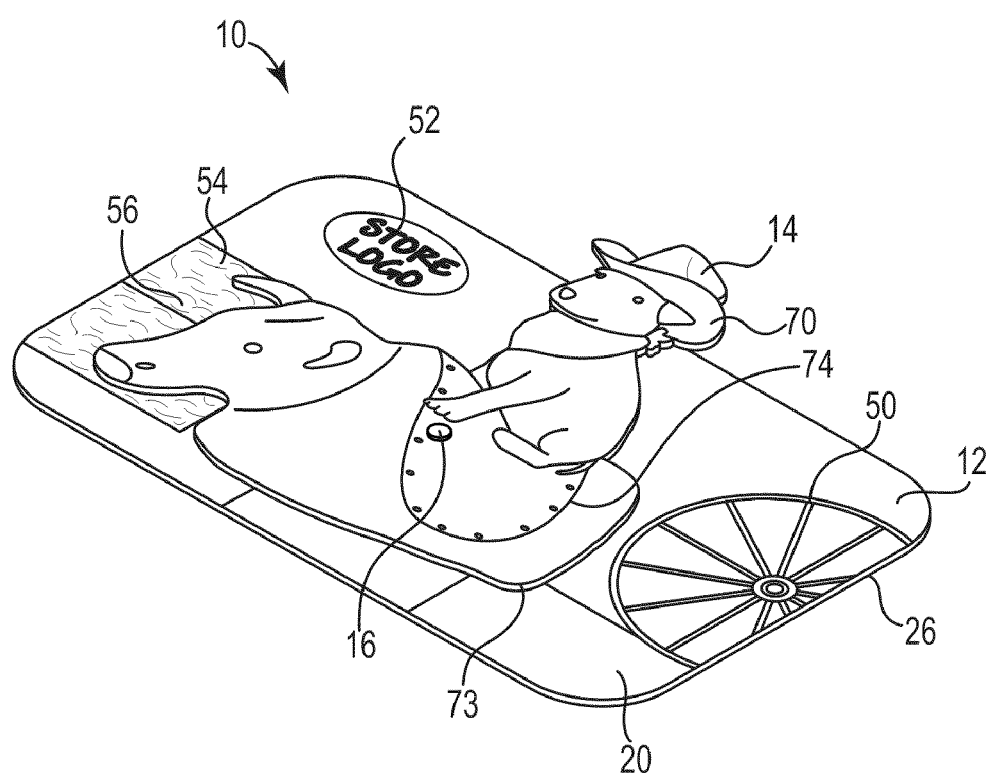
FIG. 1 is a perspective view illustration of a transaction card, according to one embodiment of the present invention.
Figure 2:
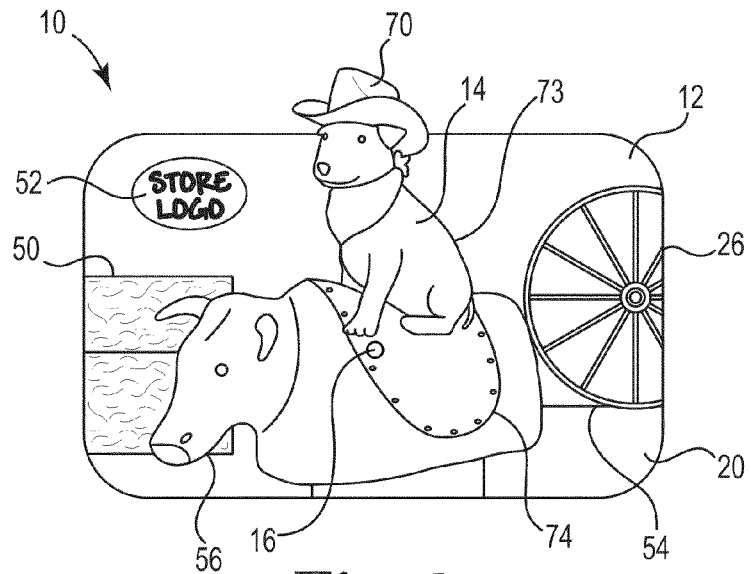
FIG. 2 is a front view illustration of the transaction card of FIG. 1, according to one embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

A stored-value card or transaction product, such as a gift card or other transaction card, is adapted for making purchases of goods and/or services at, for example, a retail store or web site. According to one embodiment, an original consumer buys a transaction card to give a recipient who in turn is able to use it to pay for goods and/or services. A transaction card, according to embodiments of the present invention, provides the consumer and recipient with extra amusement in addition to the ability to pay for goods and/or services with the stored-value card.

In particular, according to one embodiment, the transaction card includes a base member forming an integral spring support for a separate auxiliary member. The spring supports the auxiliary member in a manner both spacing the spring member from the remainder of the base member and allowing the auxiliary member to wobble, bobble, and/or shake relative to the base member when energy is imparted to the auxiliary member by a bearer pushing on the auxiliary member. The wobbling of the auxiliary member provides an unexpected and entertaining effect. A bearer of the transaction card is able to induce additional movement of the auxiliary member by shaking the transaction card, flicking or otherwise pushing the auxiliary member relative to the base member, etc. The internal spring biases the auxiliary member to return to substantially the same neutral position once the energy loaded to the spring is spent and the wobbling of the auxiliary member relative to the base member subsides. In one embodiment, this amusing aspect of the transaction card promotes sale, use, and/or loading of the transaction card by potential consumers and/or bearers of the transaction card.

Turning to the figures, FIGS. 1-8 illustrate various views of one embodiment of a transaction card 10 (e.g., a stored-value card, gift card, or calling card). The transaction card 10 includes a first or base member 12, a second or auxiliary member 14, and a connection device 16. Base member 12 serves as a primary portion of transaction card 10 and supports auxiliary member 14. Auxiliary member 14 is movably coupled to base member 12 with connection device 16.

In one embodiment, base member 12 defines a front surface 20 (i.e., a first major surface) and a rear surface 22 (i.e., a second major surface) opposite front surface 20 separated by a thickness of transaction card 10. In one embodiment, at least one of front and rear surfaces 20 and 22 is substantially planar. In one example, base member 12 is substantially rectangular in shape, and, in one embodiment, is similarly sized to an identification card, a credit card, or other card sized to fit in a wallet of a card bearer (i.e. is wallet sized). Accordingly, in one example each of front surface 20 and rear surface 22 are substantially rectangular and/or otherwise wallet sized. In particular, in one embodiment, the overall dimensions of base member 12 are about 8.5 cm by about 5.5 cm wide with a thickness of less than about 1 mm. In other embodiments, base member 12 is otherwise shaped as a square, circle, oval, star, or any other suitable shape.

In one embodiment, a spiral cut 24 is formed through base member 12. More specifically, spiral cut 24 is formed in an internal portion of base member 12 entirely spaced from an outer perimeter 26 of base member 12. A portion of base member 12 positioned generally within the confines of an outer curve 30 of spiral cut 24 is considered a coiled or spiral portion 32 of base member 12. As such, spiral cut 24 defines an outer perimeter of spiral portion 32. Spiral portion 32 defines a center 28 at an innermost portion thereof. Spiral cut 24 is generally in the form of a planar curve extending around center 28 while continuously receding away from center 28.

Spiral cut 24 extends entirely through base member 12 such that spiral portion 32 can be pulled transversely away from the plane defined by front surface 20 of base member 12. When spiral portion 32 is pulled away from front surface 20 of base member 12, spiral portion 32 takes on a conic helical form (e.g., a coil shape with a diameter decreasing as it approaches center 28). In one embodiment, base member 12 is formed of a suitable material to deform forwardly when spiral portion 32 is pulled forward and to maintain a part or a percentage of that deformation. As such, even after the pulling force is removed from spiral portion 32, spiral portion 32 continues to extend forward away from the otherwise substantially planar front surface 20 of base member 12 as illustrated in FIGS. 1 and 4-7. In one embodiment, when extending away from front surface 20 of base member 12, spiral portion 32 serves as a spring integrally formed from a single sheet of material with a remainder of base member 12.

Base member 12 is formed of any suitable substrate such as a somewhat rigid yet flexible material in a substantially planar form. More specifically, in one embodiment, base member 12 is a substantially planar member formed of plastic (e.g. polycarbonate, polystyrene, polyvinyl chloride (PVC), acrylonitrile butadiene styrene (ABS), polyethylene terephthalate (PET), teslin, polyactide (PLA) or acrylic), a composite, or other suitable material with sufficient flexibility and rigidity to allow spiral portion 32, which remains integral with the remainder of base member 12, to be pulled forward, to retain some of the induced deformation, and to otherwise function as a support for auxiliary member 14 as described in detail below. In one embodiment, base member 12 is cut from sheet-stock plastic material (e.g., outer perimeter 26 and spiral cut 24 are cut from the sheet-stock plastic material). Base member 12 can be formed in any other suitable planar or non-planar configuration as will be apparent to those of skill in the art upon reading this application.

Figure 3:
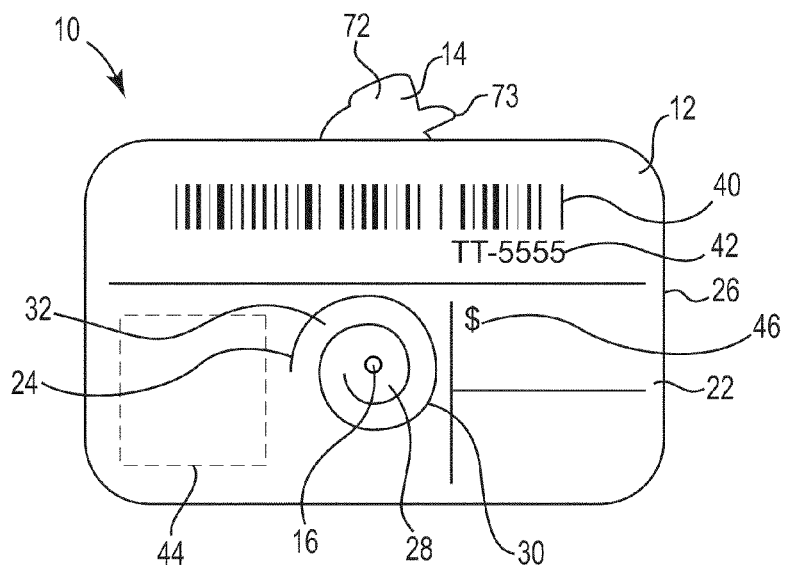
FIG. 3 is a rear view illustration of the transaction card of FIG. 1, according to one embodiment of the present invention.
Figure 4:
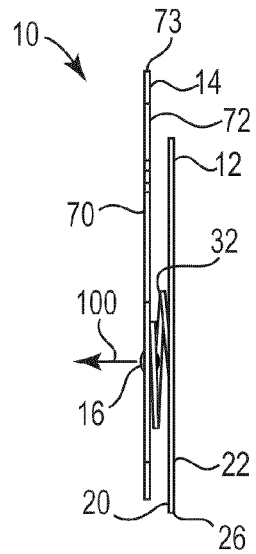
FIG. 4 is a right side view illustration of the transaction card of FIG. 1, according to one embodiment of the present invention.
Figure 5:
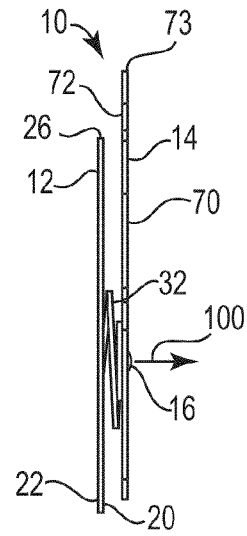
FIG. 5 is a left side view illustration of the transaction card of FIG. 1, according to one embodiment of the present invention.
Figure 6:
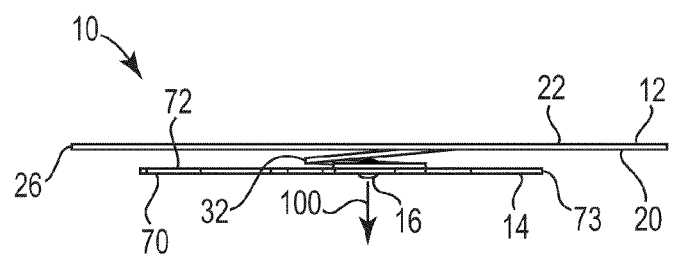
FIG. 6 is a top view illustration of the transaction card of FIG. 1, according to one embodiment of the present invention.
Figure 7:
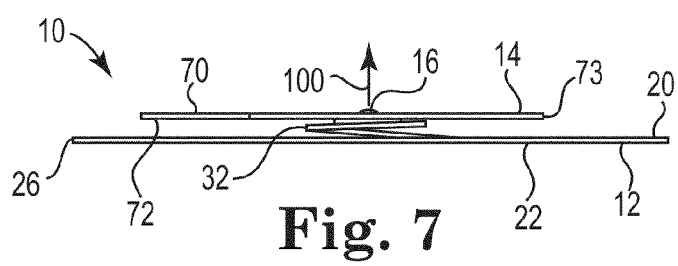
FIG. 7 is a bottom view illustration of the transaction card of FIG. 1, according to one embodiment of the present invention.

Referring to the rear view illustration of FIG. 3, in one example rear surface 22 of base member 12 or any other suitable portion of transaction card 10, includes at least one account activation area or account identifier 40, such as a bar code, magnetic strip, a smart chip or other electronic device, a radio frequency identification (RFID) device or other suitable identifier readily machine readable by a point-of-sale terminal or other account access station or kiosk. Account identifier 40 indicates an account or record to which transaction card 10 is linked. The account or record of the monetary or other balance on transaction card 10 optionally is maintained on a database, other electronic or manual record-keeping system or, in the case of "smart" cards for example, on a chip or other electronic device(s) on transaction card 10 itself. Accordingly, by scanning account identifier 40, the account or record linked to transaction card 10 is identified and can subsequently be activated, have amounts debited therefrom, and/or have amounts added thereto.

In one embodiment, account identifier 40 includes a character string or code 42 (e.g., a number and/or letter string) configured to provide additional security to the user of transaction card 10 and/or configured to be read by a bearer of transaction card 10 to facilitate use of transaction card 10 for web site or other purchases outside of brick-and-mortar type retail establishments. With the above in mind, account identifier 40 is one example of means for linking transaction card 10 with an account or record, and scanning of account identifier 40 is one example of means for activating or loading value on transaction card 10. Base member 12 is one example of means for supporting account identifier 40.

In one embodiment, redemption indicia 44 are included on transaction card 10 such as on rear surface 22 of base member 12. Redemption indicia 44 indicate that transaction card 10 is redeemable for the purchase of goods and/or services and that, upon use, a value of the purchased goods and/or services will be deducted from the account or record linked to transaction card 10. In one embodiment, redemption indicia 44 include phrases such as "<NAME OF STORE> GiftCard" and "This GiftCard is redeemable for merchandise or services at any of our stores or at our web site," and/or provides help or phone line information in the case of a lost, stolen, or damaged transaction card, etc.

In one embodiment, transaction card 10 includes indicia indicating amount fields 46 configured to be marked by a bearer of transaction card 10, retail store employee, or other individual to indicate a value initially loaded on transaction card 10.

In one embodiment, front surface 20 of base member 12 or other suitable portion of transaction card 10 includes background indicia 50. Background indicia 50 include any suitable graphics, text, or combinations thereof. In one example, background indicia 50 include one or more of a brand identifier 52 and a first portion 54 of a graphic or scene 56. In one example, any one or more of redemption indicia 44 and brand identifier 52 may not be included on transaction card 10. Brand identifier 52 includes one or more of a logo, text, trademark, etc. that associate transaction card 10 with at least one of a product, a brand, a store, etc.

In one embodiment, scene 56 is any fictional or non-fictional character, an animal (e.g. a mammal or a reptile), a person, an insect, a scene, text, an object, a design, a picture, a graphic, etc. or combination thereof that can be visually divided into multiple portions and is collectively defined by at least two members of transaction card 10, for example, by base member 12 and auxiliary member 14. First portion 54 of scene 56 is any suitable portion of scene 56 as will be apparent upon reading the present application. In one embodiment, first portion 54 of scene 56 is a scene and illustrates a background or portion of scene 56 generally of lesser focus or visual importance. For example, as illustrated in FIGS. 1-8, scene 56 is a background or body portion of scene 56 setting the environment for the remainder of scene 56.

In one example, an aperture 60 (FIG. 8) is formed through base member 12 to facilitate coupling of base member 12 to auxiliary member 14, for example, sized to receive connection device 16, as will be further described below. In one example, aperture 60 is positioned through center 28 of spiral portion 32.

In one embodiment, auxiliary member 14 is generally a panel defining a first major or front surface 70 and a second major or rear surface 72 (e.g., FIG. 3) opposite front surface 70. One or both of front surface 70 and rear surface 72 are substantially planar. In one example, an outer perimeter 73 of auxiliary member 14 follows or is substantially coextensive with an outer perimeter of a second portion 74 of scene 56 (e.g., outer perimeter 73 of auxiliary member 14 shares a substantial portion of an outer perimeter of second portion 74 of scene 56) defined by auxiliary member 14. Otherwise stated, in one embodiment, second portion 74 of scene 56 is positioned immediately adjacent outer perimeter 73 of auxiliary member 14.

Second portion 74 of scene 56 defines any suitable portion of scene 56 and, in one embodiment, depicts a portion of scene 56 considered the central portion of scene 56 or otherwise forming a portion of scene 56 that will be visually and dynamically emphasized and/or animated by the construction and allowed movement of portions of transaction card 10 as will be further described below. In one embodiment, second portion 74 is a portion of scene 56 that will entertainingly be presented as a bobbling or wobbling portion of scene 56. For example, second portion 74 may be a head where first portion 54 of scene 56 includes a body corresponding with the head. In one example, as illustrated in FIGS. 1-8, second portion 74 includes an animal, simulated animal, automobile, bicycle, person, character, etc. generally known to move relative to first portion 54 (e.g., a background) of scene 56. In one embodiment, second portion 74 of subject includes one of a bull, a mechanical bull, a horse, a rocking horse, or similar depiction as will be apparent to those of skill in the art upon reading this application.

Figure 8:
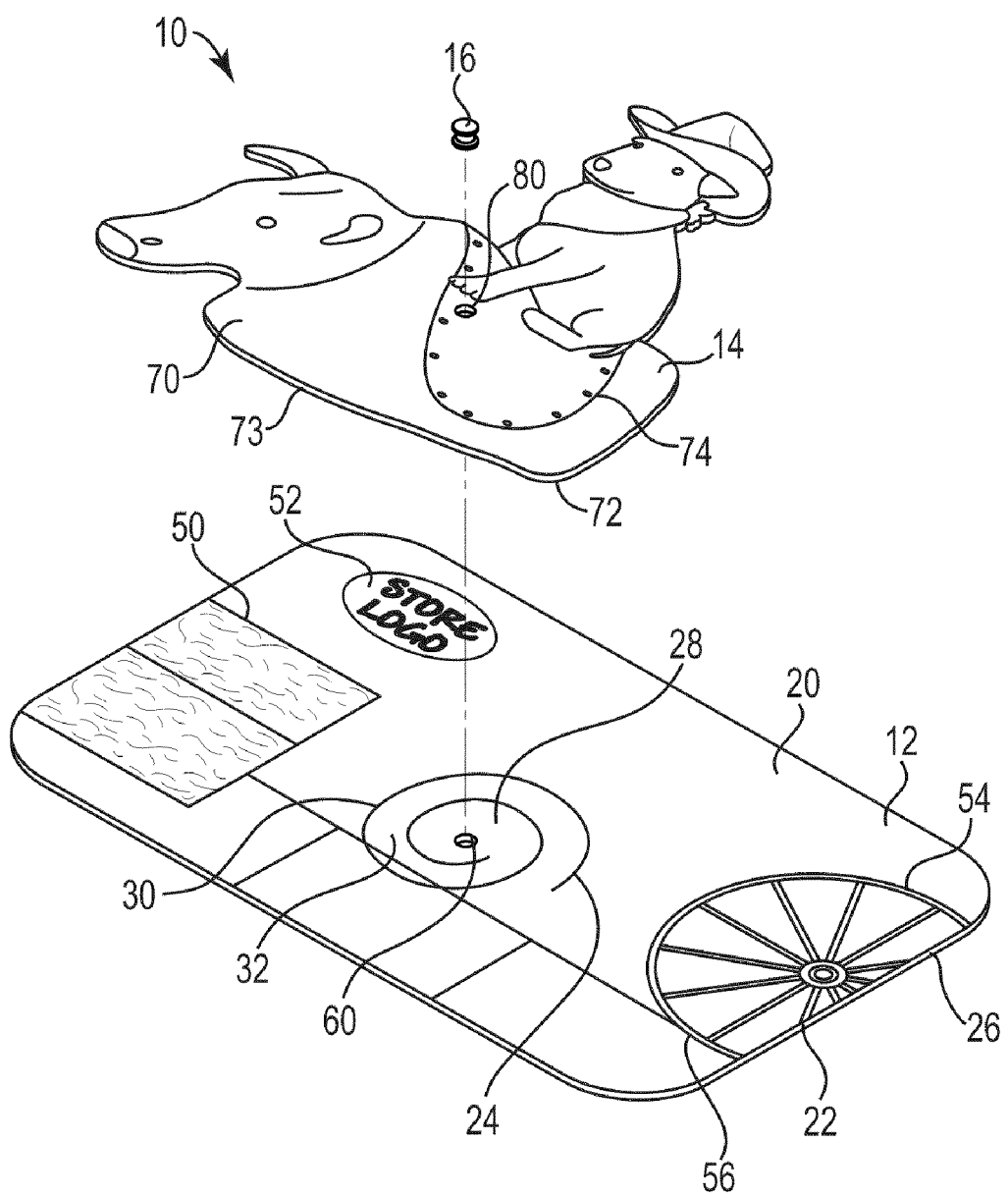
FIG. 8 is an exploded, front perspective view illustration of the transaction card of FIG. 1, according to one embodiment of the present invention.

In one embodiment, an aperture 80 is defined through auxiliary member 14, for example, through a center portion of auxiliary member 14 as illustrated in FIG. 8. Auxiliary member 14 may be formed in any suitable size and shape as will be apparent to those of skill in the art upon reading this application. In one example, auxiliary member 14 is defined to have at least one overall dimensional (e.g., length or width) that is less than a corresponding, overall dimension of base member 12. For instance, as illustrated in FIGS. 1-8, a width (i.e., a dimension from left to right) of auxiliary member 14 is less than a width of base member 12. In one embodiment, where a dimension of base member 12 is larger than a corresponding dimension of auxiliary member 14, at least a part of base member 12, and, in one example, a part of first portion 54 of scene 56, is readily viewable around auxiliary member 14 when transaction card 10 is fully assembled as described below.

In one embodiment, auxiliary member 14 is formed of a somewhat rigid material, for example, paper, cardstock, plastic (e.g. polycarbonate, polystyrene, PVC, ABS, PET, teslin, PLA or acrylic) or other suitable material. In one example, auxiliary member 14 is formed of a material that is substantially opaque such that one cannot generally see through auxiliary member 14. In such an example, front surface 70 is printed with second portion 74 of scene 56. In one embodiment, auxiliary member 14 is formed of the same material as base member 12. Although primarily described herein as only having one auxiliary member 14, upon reading this application, it should be understood that additional auxiliary members may be added to transaction card 10.

To assemble transaction card 10, rear surface 72 of auxiliary member 14 is placed on front surface 20 of base member 12 in a manner coaxially aligning aperture 60 of base member 12 with aperture 80 of auxiliary member 14. In one example, upon aligning aperture 60 with aperture 80, connection device 16 (e.g., a rivet, grommet, or screw) is placed through each aperture 60 and 80 and secured in a manner coupling base member 12 to auxiliary member 14. In one example, one or both of apertures 60 and 80 is not preformed in the respective base member 12 and auxiliary member 14, but rather is punched through or otherwise formed when connection device 16 is secured to base member 12 and auxiliary member 14. Other suitable fasteners (e.g., staples or adhesive) are also contemplated and may or may not use apertures 60 and/or 80 such that one or both of apertures 60 and 80 may be eliminated.

In one embodiment, connection device 16 secures base member 12 to auxiliary member 14 in a manner generally decreasing if not preventing rotation of auxiliary member 14 relative to base member 12. In another embodiment, following assembly, auxiliary member 12 is free to rotate about connection device 16 relative to base member 12. In one embodiment, base member 12 and auxiliary member 14 are sized such that at least a portion of base member 12 including at least a part of first portion 54 of scene 56 is viewable around auxiliary member 14. In one example, auxiliary member 14 extends beyond outer perimeter 26 of base member 12 in at least one direction, for instance, a direction substantially perpendicular to a direction spiral portion 32 extends from a portion of first surface 20 defined by the remainder of base member 12. More specifically, in the illustrated embodiments, auxiliary member 14 extends about a top edge of outer perimeter 26 of base member 12.

Since connection device 16 goes through spiral portion 32 of base member 12, auxiliary member 14 is coupled to center 28 of spiral portion 32. In one example, upon coupling auxiliary member 14 to base member 12, a manufacturer, display store employee, or the end consumer pulls auxiliary member 14 forward relative to base member 12, for example, in the direction indicated by arrow 100 in FIGS. 4-7. Pulling auxiliary member 14 away from base member 12, spiral portion 32 of base member 12 is stretched or otherwise extended and deformed such that spiral portion 32 gradually extends further away from base member 12 as it moves from an outer portion thereof toward center 28 or connection device 16.

As described above, base member 12 is formed of a suitable material such that once the pulling force is removed, spiral portion 32 may retract slightly back toward front surface 20 of base member 12, but generally remains in a position extending in front of front surface 20 of base member 12. For example, once the pulling force is removed, rear surface 72 of auxiliary member 14 remains spaced from front surface 20 of base member 12 a distance of at least about one-eighth of an inch. Notably, when spiral portion 32 is extended, an opening is formed through base member 12 where spiral portion 32 used to sit coplanar with the remainder of base member 12.

Once extended, spiral portion 32 is of sufficient rigidity to hold auxiliary member 14 substantially spaced from front surface 20 of base member 12, but allows rocking, shaking, oscillation, or other movement about the point where spiral portion 32 connects with a remainder of base member 12. More specifically, upon bearer interaction with auxiliary member 14, spiral portion 32 vibrates or oscillates about a longitudinal axis of spiral portion 32 causing entertaining movement of auxiliary member 14 and, therefore, second portion 74 of scene 56, relative to base member 12 and, therefore, first portion 54 of scene 56, for a number of seconds. In view of the above, spiral portion 32 is one example of a spring or coiled means for extending between base member 12 and auxiliary member 14.

Figure 9:
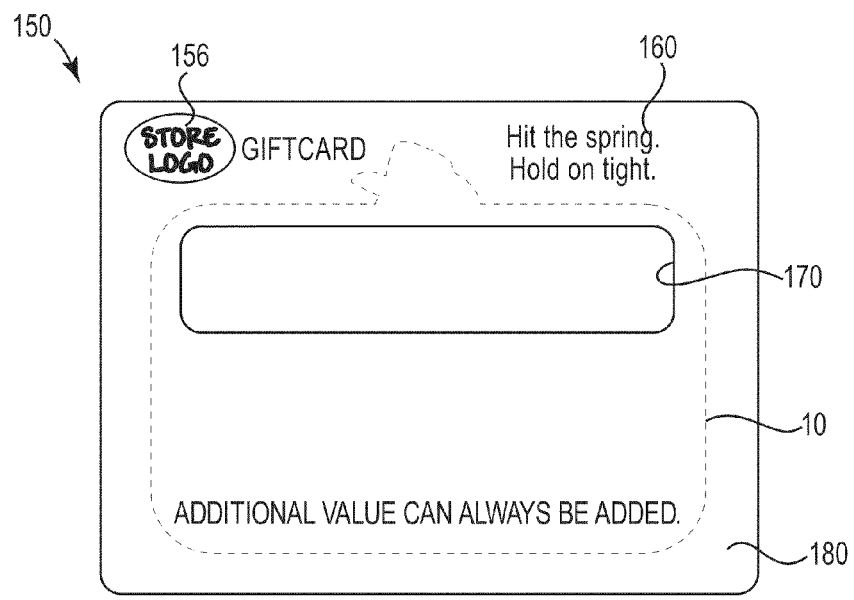
FIG. 9 is a front view illustration of a backer, according to one embodiment of the present invention.
Figure 10:
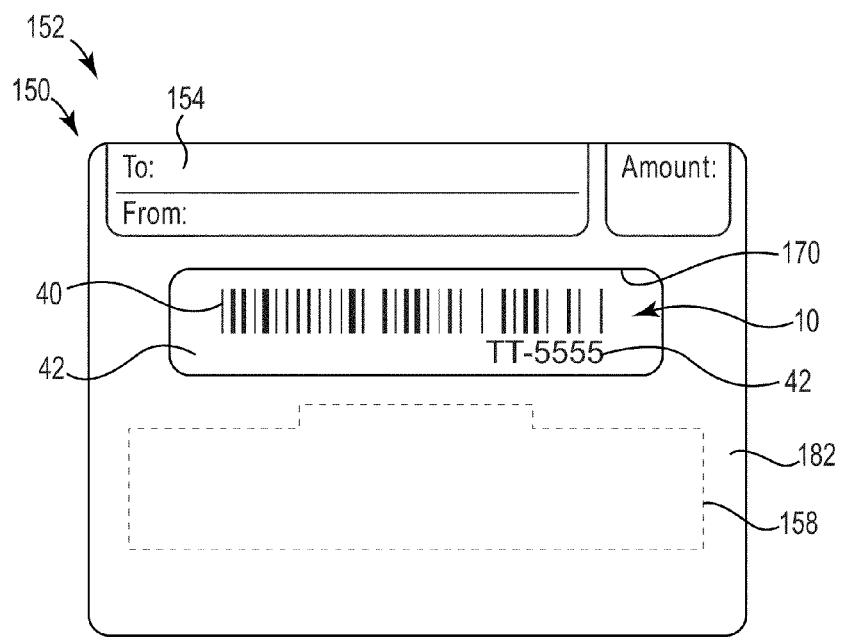
FIG. 10 is a rear view illustration of a transaction card assembly including the backer of FIG. 9 and the transaction card of FIG. 1, according to one embodiment of the present invention.

FIGS. 9 and 10 illustrate a carrier or backer 150 configured to be selectively coupled with and to support transaction card 10. Transaction card 10, which is only represented in dashed lines in FIG. 9 for illustrative purposes so as to not obstruct backer 150, is readily releasably attached to backer 150, for example by a removable adhesive, an overlying skinning material, blister packaging or the like. Backer 150 and transaction card 10 collectively define a transaction card assembly 152 (FIG. 10). Backer 150 comprises a single layer or multiple layers of paper or plastic material, for example, generally in the form of a relatively stiff but bendable/flexible card. Use of other materials is also contemplated. Backer 150 displays indicia, graphics or text information including store logo(s), store name(s), slogans, advertising, instructions, directions, brand indicia, promotional information, holiday indicia, seasonal indicia, media format identifiers, characters and/or other information.

For example, referring to FIG. 10, indicia 154 include to, from, and amount fields. The fields of indicia 154 provide areas of backer 150 configured to be written upon by a consumer to personalize backer 150 for presentation as a gift to a particular recipient, for a particular purpose, and/or to indicate a value of transaction card 10. In one embodiment, backer 150 includes brand indicia 156, which identify a store, brand, department, etc. and/or services associated with transaction card 10.

In one embodiment, backer 150 includes redemption indicia 158, generally indicated by a dashed box in FIG. 10, indicating that transaction card 10 is redeemable for the purchase of goods and/or services and that upon use, a value of the purchased goods and/or services will be deducted from the financial account or record linked to transaction card 10. In one embodiment, redemption indicia 110 include phrases such as "<NAME OF STORE> GiftCard" and "This GiftCard is redeemable for merchandise or services at any of our stores or at our web site," and/or provides help or phone line information in case of a lost, stolen, or damaged transaction card 10, etc.

As illustrated in FIG. 9, in one example, indicia 160 promote the non-transactional or amusing functionality of transaction card 10. In one embodiment, indicia 160 generally indicate to a bearer of transaction card assembly 152 that upon interacting with transaction card 10 or a portion thereof, movement of auxiliary member 14 will be induced. In one example, indicia 160 state "Hit the spring. Hold on tight." As such, indicia 160 further promote the sale of transaction card 10 by drawing the attention of a potential consumer to the non-transactional and amusing feature(s) of transaction card 10.

Any of indicia 44, 154, 156, 158, and 160, account identifier 40 and/or other indicia optionally may appear anywhere on backer 150 or transaction card 10. Additional information besides that specifically described and illustrated herein may also be included and/or one or more of code indicia 44, 154, 156, 158, and 160 may be eliminated.

In one embodiment, backer 150 includes a window or opening 170 for displaying account identifier 40 of transaction card 10 therethrough as illustrated in FIG. 10. As previously described, account identifier 40 is adapted for accessing an account or a record associated with transaction card 10 for activating, loading value to or debiting value from the account or record. In one example, transaction card 10 is coupled with or positioned adjacent a first or front surface 180 (FIG. 9) of backer 150, and a bearer viewing a second or rear surface 182 (FIG. 10) of backer 150, which is opposite front surface 180, can view or access account identifier 40 through opening 170. Accordingly, opening 170 allows viewing or other access to account identifier 40 to activate and/or load transaction card 10 without removing transaction card 10 from backer 150. In one embodiment, a portion of backer 150 alternatively is configured to be folded away from the remainder of backer 150 to access account identifier 40 without removing transaction card 10 from backer 150. Other foldable or non-foldable backers can be used having various sizes and shapes for supporting transaction card 10.

Figure 11:
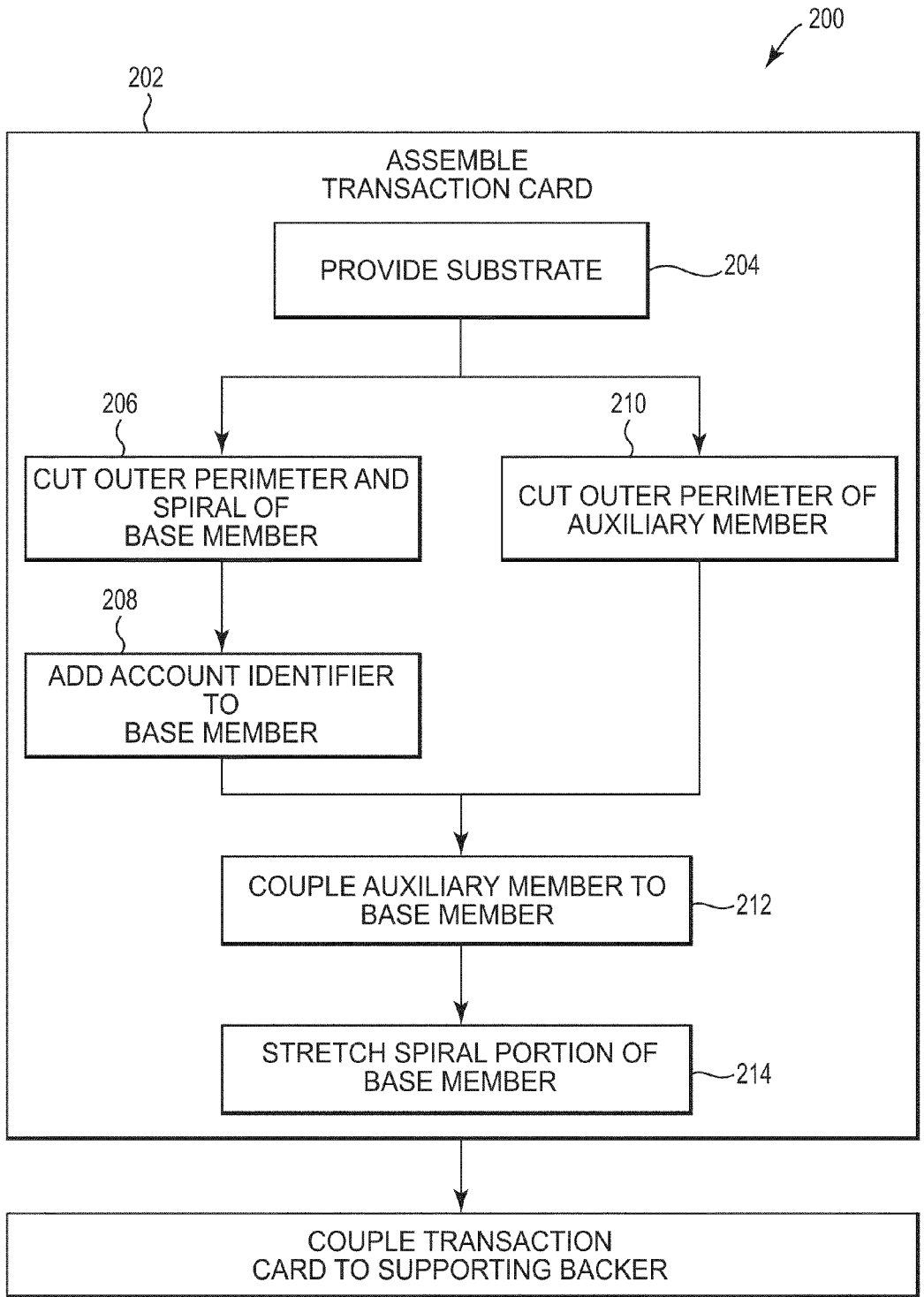
FIG. 11 is a flow chart illustrating a method of assembling a transaction card assembly, according to one embodiment of the present invention.

FIG. 11 is a flow chart illustrating a method of assembling transaction card assembly 152 as generally indicated at 200. At 202, transaction card 10 is assembled. More particularly, at 204, one or more single piece substrates (e.g., plastic material in sheet form) are provided. At 206, outer perimeter 26 and spiral cut 24 of base member 12 are cut in one piece of the substrate.

At 208, account identifier 40 is added to base member 12, if account identifier 40 is not already part of transaction card 10 (e.g., printed or otherwise applied to the substrate prior to operation 206). Although illustrated in FIG. 11 as occurring after 206, it should be understood that account identifier 40 may be applied to any portion of transaction card 10 at any suitable time during manufacturing and assembly thereof. For example, account identifier 40 may be molded into or otherwise integrally formed as part of base member 12 and/or auxiliary member 14 before or after operation 206 as will be apparent to those of skill in the art upon reading this application.

At 210, outer perimeter 73 of auxiliary member 14 is cut from the same or a similar piece of the substrate. In one embodiment, not illustrated, base member 12 and auxiliary member 14 are formed out of different materials and/or one of base member 12 and auxiliary member 14 (e.g., auxiliary member 14) is alternatively formed by injection molding. Operations 206 and 210 may be performed in sequence, reverse sequence, and/or substantially simultaneously.

At 212, auxiliary member 14 is coupled to base member 12. For example, rear surface 72 of auxiliary member 14 is placed on front surface 20 of base member 12 in a manner coaxially aligning aperture 60 of base member 12 with aperture 80 of auxiliary member 14. In one example, upon aligning aperture 60 with aperture 80, connection device 16 (e.g., a rivet, grommet, or screw) is placed through each aperture 60 and 80 and secured in a manner coupling base member 12 to auxiliary member 14. In one example, one or both of apertures 60 and 80 is not preformed in the respective base member 12 and auxiliary member 14, but rather is punched through or otherwise formed when connection device 16 is secured to base member 12 and auxiliary member 14. Other suitable fasteners (e.g., staples or adhesive) are also contemplated and may or may not use apertures 60 and/or 80 such that one or both of apertures 60 and 80 may be eliminated. In one embodiment, auxiliary member 14 is more specifically coupled to center 28 of spiral portion 32 of base member 12.

At 214, spiral portion 32 is stretched in the direction of arrow 100 (e.g., forward from front surface 20 of base member 20) by an external force applied thereto. Once the external force is removed, spiral portion 32 may retract back toward a remainder of base member 12, but not back to a position coplanar with the remainder of base member 12. In other words, even after the external force is removed, spiral portion 32 extends outwardly in front of the portion of front surface 20 formed by the remainder of base member 12. In one example, spiral portion 32 extends in a conic helical form such that spiral portion 32 is configured to function similar to a conically shaped spring. Once spiral member 32 is extended, auxiliary member 14 is consequently spaced from the portion of front surface 20 defined by a remainder of base member 12.

At 216, transaction card 10 is coupled with backer 150 as generally illustrated with additional reference to FIGS. 9 and 10 to form transaction card assembly 152. As described above, transaction card 10 may be adhered, skinned to, blister packed with or otherwise suitably coupled to backer 150. In one embodiment, account identifier 40 of transaction card 10 is accessible for scanning while transaction card 10 is coupled with backer 150, for example, through opening 170 in backer 150.

Figure 12:
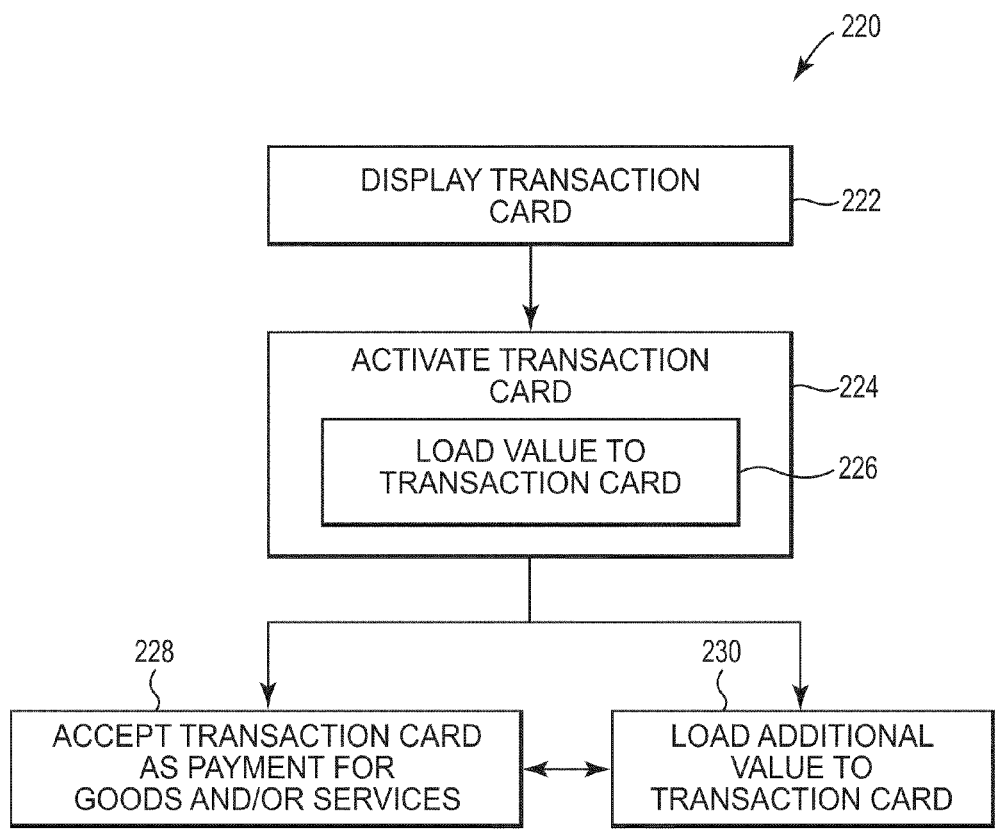
FIG. 12 is a flow chart illustrating a method of encouraging purchase and facilitating use of a transaction card, according to one embodiment of the present invention.

FIG. 12 is a flow chart illustrating one embodiment of a method 220 of encouraging purchase and facilitating use of transaction card 10 by consumers and/or recipients. At 222, transaction card 10 is placed on or hung from a rack, shelf, or other similar device to display transaction card 10 for sale to potential consumers. For example, additionally referring to FIGS. 9 and 10, transaction card assembly 152 is placed on a display rack such that transaction card 10 is readily visible to potential consumers. In one embodiment, transaction card assembly 152 is presented to potential consumers on a retail display such that potential consumers are able to take transaction card assembly 152 and interact with the non-transaction features (e.g., the wobbling features) of transaction card 10 prior to purchasing or otherwise activating transaction card 10. In one embodiment, a depiction of transaction card 10 is additionally or alternatively placed on a website for viewing and purchase by potential consumers.

At 224, a consumer who has decided to purchase transaction card 10 presents transaction card 10 on backer 150 to a retail store employee, retail store kiosk, remote terminal, or other person or device to scan account identifier 40 to access an account or record linked to account identifier 40. In particular, account identifier 40 is scanned or otherwise accessed, for example through opening 170 of backer 150 to activate transaction card 10. Upon accessing the account or record, then, at 226, value is added to the account or record in the form of monetary value, points, minutes, etc. Thus, transaction card 10 is activated and loaded.

In one example, a predetermined value is associated with transaction card 10 (i.e., associated with the account or record linked to transaction card 10 via account identifier 40) prior to activation and display, but such predetermined value is not initially available for use toward the purchase or use of goods and/or services. In such an embodiment, at 224, transaction card 10 is activated to permit subsequent access to the predetermined value (e.g., subsequent loading on and debiting from the account or record) and no additional value is added during activation such that operation 226 may be eliminated.

Once transaction card 10 is activated and loaded, transaction card 10 can be used by the consumer or any other bearer of transaction card 10 to purchase goods and/or services at the affiliated retail setting (e.g., a retail store or website) or can be used in exchange for calling minutes, etc. In one embodiment, where transaction card 10 is displayed on a website at 222, then, at 224, transaction card 10 may be activated in any suitable method and may not require the physical scanning of account identifier 40 to be activated or to otherwise access the associated account or record such as at 226.

In one example, at 228, the retail store or other affiliated retail setting or website accepts transaction card 10 as payment toward the purchase of goods and/or services made by the current bearer of transaction card 10. In particular, the value currently loaded on transaction card 10 (i.e., stored or recorded in the account or record linked to account identifier 40) is applied toward the purchase of goods and/or services. At 230, additional value is optionally loaded on transaction card 10 at a point-of-sale terminal, kiosk or other area of the retail store or related setting. Upon accepting transaction card 10 as payment at 228, the retail store or related setting can subsequently perform either operation 228 or operation 230 as requested by a current bearer of transaction card 10. Similarly, upon loading additional value on transaction card 10 at 230, the retail store or related setting can subsequently perform either operation 230 again or operation 228. In one example, the ability to accept transaction card 10 as payment for goods and/or services is limited by whether the account or record associated with transaction card 10 has any value stored or recorded therein at the time of attempted redemption.

Figure 13:
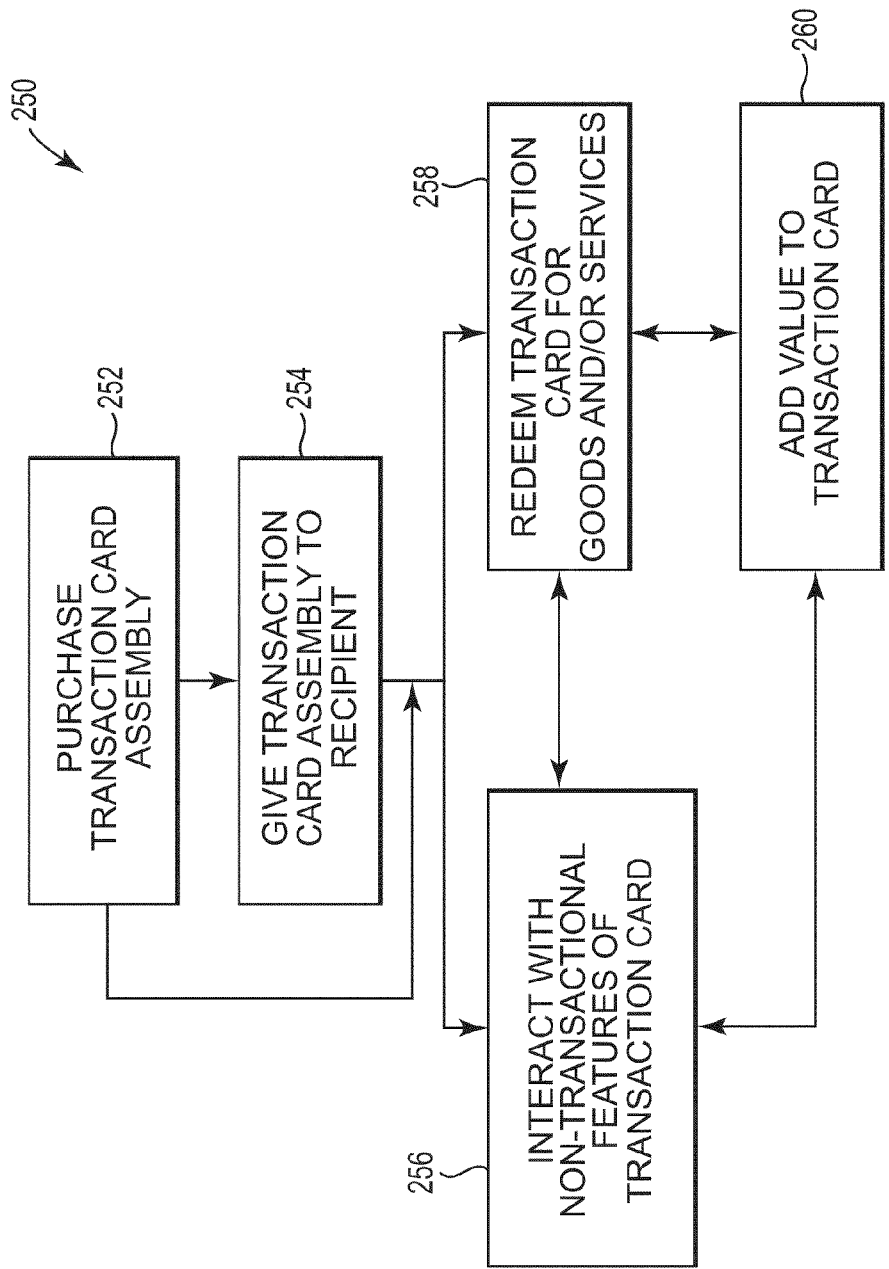
FIG. 13 is a flow chart illustrating a method of using a transaction card, according to one embodiment of the present invention.

FIG. 13 is a flow chart illustrating one embodiment of a method 250 of using transaction card 10 (e.g., FIGS. 1-8). At 252, a potential consumer of transaction card 10, which is displayed in a retail store or viewed on a website, decides to and does purchase transaction card 10 from the retail store or website. It should be understood that transaction card 10 can be displayed and purchased alone or as part of transaction card assembly 152 (FIG. 10) along with backer 150. Upon purchasing transaction card 10, a retail store employee, a retail store kiosk or other person or device scans account identifier 40 (FIGS. 3 and 10) through opening 170 of backer 150 or otherwise reads or accesses account identifier 40. Upon accessing account identifier 40, the account or record linked to account identifier 40 is accessed and activated to load value onto transaction card 10 (i.e., load value to the account or record associated with transaction card 10). In one embodiment, such as where transaction card 10 is purchased at 252 via a website, actual scanning or other mechanical detection of account identifier 40 may be eliminated.

At 254, the consumer optionally gives transaction card 10 to a recipient, such as a graduate, relative, friend, expectant parents, one having a recent or impending birthday, a couple having a recent or impending anniversary, etc. In one embodiment, a plurality of transaction cards 10 are purchased and given to party goers, such as at a birthday party, etc. as party favors or gifts. As an alternative, the consumer can keep transaction card 10 for his or her own use thereby eliminating operation 254.

At 256, the consumer, recipient, or other current bearer of transaction card 10 interacts with the non-transactional features thereof for amusement. More specifically, the bearer of transaction card 10 interacts with auxiliary member 14 or spiral portion 32 of base member 12 by flicking, tapping, or otherwise pushing auxiliary member 14 and/or spiral portion 32 to induce movement of spiral portion 32 and auxiliary member 14. For example, spiral portion 32 is not statically positioned relative to base member 12, but rather has elastic or resilient properties, for example, as described above, such that spiral portion 32 shakes, wobbles, or otherwise oscillates about the longitudinal axis of spiral portion 32 with auxiliary member 14 attached thereto. The oscillation and wobbling continues until the energy imparted to spiral portion 32 by the bearer's interaction therewith dissipates. Such random movement results in animation of scene 56 collectively defined by base member 12 and auxiliary member 14, which, in turn, amuses the bearer and any other observers of transaction card 10.

At 258, the consumer or recipient redeems transaction card 10 for goods and/or services from the retail store or website. At 260, the consumer or recipient of transaction card 10 optionally adds value to transaction card 10, more particularly, to the account or record associated with account identifier 40 included therewith, at the retail store or over the Internet (i.e., via the website). Upon interacting with the non-transaction feature of transaction card 10 at 256, redeeming transaction card 10 at 258 or adding value to transaction card 10 at 260, the consumer or recipient of transaction card 10 subsequently can perform any of operations 256, 258, or 260 as desired. In one embodiment, the ability of the consumer or recipient to repeat redeeming transaction card 10 at 258 is limited by whether the account or record linked with transaction card 10 has any remaining value stored or recorded therein at the time of attempted redemption.

Although described above as occurring at a single retail store or website, in one embodiment, purchasing transaction card 10 at 252, redeeming transaction card 10 at 258, and adding value to transaction card 10 at 260, can each be performed at any one of a number of stores adapted to accept transaction card 10 or over the Internet. In one example, a number of stores are each part of a chain or are similarly branded stores. In one example, a number of stores include at least one website and/or at least one conventional brick and mortar store.

Transaction cards come in many forms, according to embodiments of the invention. Stored-value cards, like other transaction cards, can be "re-charged" or "re-loaded" at the direction of the original consumer, the gift recipient or a third party. The term "loading on" or "loaded on" herein should be interpreted to include adding to the balance of an account or record associated with a transaction card. The balance associated with the transaction card declines as the card is used, encouraging repeat visits or use. The card remains in the user's purse or wallet, serving as an advertisement or a reminder to revisit the associated merchant. Stored-value cards according to embodiments of the invention provide a number of advantages to both the consumer and the merchant. Other stored-value cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction card comprising:
a base member defining a first surface, a second surface opposite the first surface, and a spiral cut extending through the base member from the first surface to the second surface to define a spiral portion, wherein the spiral portion is stretched to extend in a conic helical form in front of a portion of the first surface defined by a remainder of the base member;
an auxiliary member coupled to the spiral portion opposite the portion of the first surface defined by the remainder of the base member; and
an account identifier fixedly connected to one of the base member and the auxiliary member, wherein the account identifier links the transaction card to at least one of an account and a record and is machine readable by a point-of-sale terminal.

2. The transaction card of claim 1, wherein the account identifier is a bar code.

3. The transaction card of claim 1, wherein the account identifier includes at least one of a bar code, a magnetic strip, a smart chip, and a radio frequency identification (RFID) device.

4. The transaction card of claim 1, wherein the first surface is substantially planar.

5. The transaction card of claim 1, wherein the auxiliary member is spaced from the portion of the first surface defined by the remainder of the base member.

6. The transaction card of claim 1, wherein the auxiliary member is coupled to a center of the spiral portion with a fastener.

7. The transaction card of claim 1, wherein the spiral portion supports the auxiliary member in a manner allowing oscillating movement of the auxiliary member relative to the base member following application of an external force to one of the spiral portion and the auxiliary member.

8. The transaction card of claim 7, wherein the base member defines a first portion of a scene and the auxiliary member defines a second portion of the scene such that oscillating movement of the auxiliary member relative to the base member appears as animated movement of the second portion of the scene relative to the first portion of the scene.

9. The transaction card of claim 7, wherein the oscillating movement continues even after the external force is no longer applied to the one of the spiral portion and the auxiliary member.

10. The transaction card of claim 1, wherein the account identifier is fixedly connected to the base member.

11. The transaction card of claim 1, wherein the auxiliary member extends beyond an outer perimeter of the base member in a direction substantially perpendicular to a direction the spiral portion extends from the portion of the first surface defined by the remainder of the base member.

12. The transaction card of claim 1, wherein an entirety of the base member is cut from a single piece of sheet material.

13. The transaction card of claim 12, wherein the sheet material includes plastic.

14. The transaction card of claim 1, wherein the spiral portion is continuously and integrally formed with the remainder of the base member and is formed through an internal portion of the base member.

15. The transaction card of claim 1, wherein an opening is defined through the base member when the spiral portion is stretched.

16. A stored-value card comprising:
a substantially planar member;
means for supporting means for linking the stored-value card with at least one of an account and a record having a value associated therewith such that the stored-value can be used as payment toward a purchase of one or more of goods and services; and
coiled means for extending between the substantially planar member and the means for supporting, wherein the coiled means is connected with each of the substantially planar member and the means for supporting, and the coiled means is integrally formed from a single piece of material with the means for supporting.

17. The stored-value card of claim 16, wherein the substantially planar member depicts a first portion of a graphic, and the means for supporting depicts a second portion of the graphic such that movement of the substantially planar member relative to the means for supporting appears as animated movement of the first portion of the graphic relative to the second portion of the graphic.

18. The stored-value card of claim 16, wherein the coiled means includes an outer perimeter defined by a spiral cut through the means for supporting.

19. The stored-value card of claim 16, wherein the means for supporting is substantially planar and an opening is formed through the means for supporting where the coiled means connects to and extends from the means for supporting.

20. A method of assembling a transaction product, the method comprising:
   providing a first member and a second member;
   adding an account identifier to one of the first member and the second member, wherein the account identifier links the transaction product to an account or a record such that the transaction product can be used during a purchase transaction to apply at least a portion of a balance of the account or the record toward a price of a purchase;
   cutting a spiral cut through an internal portion of the first member to define a spiral portion of the first member;
   coupling the second member to a center of the spiral portion; and
   stretching the spiral portion away from a remainder of the first member such that the center of the spiral portion and the second member are each spaced from the first member and the spiral portion acts as a spring allowing wobbling movement of the second member relative to the first member when an external force is applied to the second member.

21. The method of claim 20, wherein providing the first member and the second member includes providing the first member to depict a first portion of a graphic, and providing the second member to depict a second portion of the graphic such that the second member and the second portion of the graphic share at least a substantial portion of an outer perimeter.

22. The method of claim 20 wherein stretching the spiral portion creates an opening through the first member.

23. A method of encouraging purchase and facilitating use of a stored-value card linked to a record or an account, the method comprising:
   displaying the stored-value card to a potential consumer, the stored-value card including a base member, an auxiliary member coupled to the base member, and an account identifier coupled with one of the base member and the auxiliary member, wherein:
      the base member defines a substantially planar front surface and an integral spring cut from an internal portion of the base member,
      the integral spring is stretched to extend forwardly from the substantially planar front surface defined by the base member,
      the auxiliary member is coupled to the integral spring opposite the substantially planar front surface such that the auxiliary member is spaced from the substantially planar front surface,
      the auxiliary member wobbles relative to the base member when an external force is applied thereto due to energy from the external force imparted to the integral spring, and
      the account identifier links the stored-value card to the record or the account having a value associated therewith; and
   activating the record or the account linked to the stored-value card to permit subsequent deductions from the value associated with the record or the account for application toward one of a purchase and a use of one or more of goods and services.

24. The method of claim 23, wherein displaying the stored-value card to the potential consumer includes allowing the potential consumer to induce and witness movement of the auxiliary member relative to the base member about the integral spring while the stored-value card is displayed and before the stored-value card is purchased.

* * * * *